(12) United States Patent
Greiveldinger et al.

(10) Patent No.: US 8,833,415 B2
(45) Date of Patent: Sep. 16, 2014

(54) PNEUMATIC TYRE WITH BUILT-IN SELF-SEALING AND PROTECTIVE LAYERS

(75) Inventors: Marc Greiveldinger, Chatel Guyon (FR); Jose Merino Lopez, Riom (FR); Michel Ahouanto, Enval (FR); Frédéric Pialot, Moissat (FR)

(73) Assignees: Compagnie Generale des Etablissements Michelin, Clermont-Ferrand (FR); Michelin Recherche et Technique S.A., Granges Paccot (CH)

( * ) Notice: Subject to any disclaimer, the term of this patent is extended or adjusted under 35 U.S.C. 154(b) by 99 days.

(21) Appl. No.: 13/395,305

(22) PCT Filed: Sep. 10, 2010

(86) PCT No.: PCT/EP2010/063274
§ 371 (c)(1),
(2), (4) Date: Apr. 19, 2012

(87) PCT Pub. No.: WO2011/032886
PCT Pub. Date: Mar. 24, 2011

(65) Prior Publication Data
US 2012/0234449 A1 Sep. 20, 2012

(30) Foreign Application Priority Data
Sep. 15, 2009 (FR) ..................... 09 56318

(51) Int. Cl.
| | | |
|---|---|---|
| B60C 19/12 | (2006.01) | |
| C09J 123/28 | (2006.01) | |
| B29C 73/22 | (2006.01) | |
| C08L 27/06 | (2006.01) | |
| C08L 27/00 | (2006.01) | |
| B60C 5/14 | (2006.01) | |
| B29C 73/16 | (2006.01) | |
| C08K 5/00 | (2006.01) | |
| B29L 30/00 | (2006.01) | |
| C08L 23/08 | (2006.01) | |
| C08L 93/00 | (2006.01) | |
| C08K 3/00 | (2006.01) | |

(52) U.S. Cl.
CPC .............. *B29C 73/163* (2013.01); *C08K 5/0016* (2013.01); *C09J 123/286* (2013.01); *C08L 2205/02* (2013.01); *B29L 2030/00* (2013.01); *C08L 2312/00* (2013.01); *C08K 5/005* (2013.01); *B29C 73/22* (2013.01); *C08L 27/06* (2013.01); *C08L 27/00* (2013.01); *C08L 23/0861* (2013.01); *C08L 23/0853* (2013.01); *B60C 5/142* (2013.04); *B60C 19/12* (2013.01); *C08L 93/00* (2013.01); *C08K 3/0041* (2013.01)
USPC ........................................................ 152/502

(58) Field of Classification Search
None
See application file for complete search history.

(56) References Cited

U.S. PATENT DOCUMENTS

| | | | | |
|---|---|---|---|---|
| 1,975,734 | A * | 10/1934 | Semon ........................ | 524/255 |
| 4,418,093 | A | 11/1983 | Gomberg et al. ................ | 427/8 |
| 4,801,344 | A | 1/1989 | Laurent et al. ................ | 156/117 |
| 4,895,692 | A | 1/1990 | Laurent ......................... | 264/326 |
| 4,913,209 | A | 4/1990 | Hong et al. .................... | 152/504 |
| 4,952,259 | A | 8/1990 | Debroche et al. ............. | 156/117 |
| 4,963,207 | A | 10/1990 | Laurent ......................... | 156/117 |
| 5,085,942 | A | 2/1992 | Hong et al. .................... | 428/492 |
| 5,295,525 | A | 3/1994 | Sanda, Jr. ....................... | 152/503 |
| 6,302,173 | B1 * | 10/2001 | Mizuno et al. ............. | 152/152.1 |
| 7,484,544 | B2 * | 2/2009 | Serra et al. .................... | 152/502 |
| 7,959,849 | B2 | 6/2011 | Lopez et al. ................... | 264/501 |
| 8,202,604 | B2 | 6/2012 | Tomoi ........................... | 428/156 |
| 2004/0127617 | A1 | 7/2004 | Vasseur et al. ................ | 524/318 |
| 2009/0038729 | A1 * | 2/2009 | Soeda et al. ................... | 152/510 |
| 2009/0084482 | A1 | 4/2009 | Majumdar et al. ............ | 152/504 |
| 2010/0032070 | A1 | 2/2010 | Albert et al. .................. | 152/504 |
| 2010/0051158 | A1 | 3/2010 | Albert et al. .................. | 152/503 |
| 2010/0300593 | A1 | 12/2010 | Merino Lopez et al. ..... | 152/504 |
| 2011/0061782 | A1 | 3/2011 | Merino Lopez et al. ..... | 152/503 |
| 2011/0108186 | A1 | 5/2011 | Abad et al. .................... | 156/114 |
| 2011/0174421 | A1 * | 7/2011 | Voge et al. .................... | 152/502 |

FOREIGN PATENT DOCUMENTS

| | | |
|---|---|---|
| CN | 101432150 A | 5/2009 |
| EP | 0 243 851 A1 | 11/1987 |
| EP | 0 248 301 A1 | 12/1987 |
| EP | 0 264 600 A1 | 4/1988 |
| FR | 2 910 382 A1 | 6/2008 |
| FR | 2 910 478 A1 | 6/2008 |
| FR | 2 916 202 A1 | 11/2008 |
| FR | 2 917 996 A1 | 1/2009 |
| FR | 2 925 388 A1 | 6/2009 |
| FR | 2 928 299 A1 | 9/2009 |
| WO | WO 00/05300 A1 | 2/2000 |
| WO | WO 02/088238 A1 | 11/2002 |
| WO | WO 2010009849 A1 * | 1/2010 |

OTHER PUBLICATIONS

Indopol Polybutene Product Bulletin (2009).*

R. Mildenberg et al., *Hydrocarbon Resins*, Chapter 5.5: "Rubber Tires and Mechanical Rubber Goods," New York, VCH, 1997, pp. 141-146.

\* cited by examiner

*Primary Examiner* — Ling Choi

*Assistant Examiner* — Catherine S Branch

(74) *Attorney, Agent, or Firm* — Fitzpatrick, Cella, Harper & Scinto

(57) ABSTRACT

A pneumatic tire with a built-in self-sealing layer is described. The tire includes an outer rubbery tread, a carcass reinforcement, a gastight layer located at an inside position relative to the carcass reinforcement, a protective layer positioned innermost, and a self-sealing layer adjacent to the protective layer and located at an inside position relative to the gastight layer. The protective layer is a chlorinated thermoplastic polymer film.

19 Claims, 2 Drawing Sheets

PNEUMATIC TYRE WITH BUILT-IN SELF-SEALING AND PROTECTIVE LAYERS

FIELD OF THE INVENTION

The present invention relates to pneumatic tyres comprising a self-sealing layer positioned on their inner wall in order to seal off any perforations in service and more particularly to such pneumatic tyres in which the self-sealing layer is placed in the blank of the pneumatic tyre before the vulcanization thereof.

TECHNOLOGICAL BACKGROUND

Many documents present such pneumatic tyres comprising a self-sealing layer over all or part of their inner surface.

By way of example, document U.S. Pat. No. 4,418,093 presents a process for uniformly positioning a layer of self-sealing material on the inner wall of a vulcanized pneumatic tyre by a combination of rotating the pneumatic tyre followed by oscillating movements until the self-sealing material is sufficiently crosslinked so as to no longer flow.

When the self-sealing layer is positioned in the uncured blank of a pneumatic tyre, one of the problems encountered is due to the very tacky nature of the self-sealing layer which adheres strongly to the curing membrane during the vulcanization phase. After the vulcanized pneumatic tyre is removed from the curing mould, parts of the self-sealing layer may remain adhesively bonded to the wall of the membrane and lead to the rapid scrapping thereof. During this high-temperature vulcanization phase, constituents of the self-sealing layer may also migrate into the curing membrane which may also reduce the service life thereof. The non-stick agents customarily used such as whitewashes or liquid silicones are completely inadequate for solving this problem.

In order to solve this problem, document US 2009/0084482 A1 discloses a pneumatic tyre with a self-sealing layer that is incorporated during the manufacture of the tyre. This pneumatic tyre comprises an outer rubber tread, a carcass reinforcement, a gastight layer positioned on the inside relative to the carcass reinforcement and a protective layer positioned innermost. It also comprises a self-sealing layer adjacent to the separable protective layer and positioned on the inside relative to the gastight layer. The protective layer is a thermoplastic film of nylon or of a mixture of nylon and rubber.

The protective layer facilitates the manufacture of the pneumatic tyre by avoiding any contact between the self-sealing layer and the tools for assembling the blank of the pneumatic tyre. This layer is also said to be separable, that is to say that it can be removed from the surface of the self-sealing layer after the vulcanization of the tyre without taking off all or part of this layer and without tearing.

DESCRIPTION OF THE INVENTION

One subject of the invention is a pneumatic tyre similar to that described previously in which the protective layer is a film constituted of a chlorinated thermoplastic polymer and in that said chlorinated thermoplastic polymer comprises at least one plasticizing additive chosen from the group formed by ethylene/vinyl acetate copolymers, polybutenes, polyesters, vinyl chloride/vinyl acetate copolymers, mellitates, triallyl cyanurate, crosslinkable acrylic compounds, epoxidized oils and mixtures thereof.

The plasticizers included in the above list favour good thermal stability of the chlorinated thermoplastic film.

Preferably, the plasticizing additive is a polymer chosen from the group formed by ethylene/vinyl acetate copolymers, vinyl chloride/vinyl acetate copolymers, polybutenes, polyesters, crosslinkable acrylic compounds, and mixtures thereof.

Such polymer plasticizing additives preferably have a number-average molecular weight ($M_n$) of between 2000 and 10 000 g/mol.

During the vulcanization phase, it has been observed that the properties of chlorinated thermoplastic films, such as a PVC film to which, as predominant plasticizer, dioctyl adipate (or another adipate or phthalate of low molecular weight) has been added, are greatly modified due to the diffusion of this plasticizer to the adjacent rubber blends (self-sealing layer on one side, curing membrane on the other). This may lead to the appearance of highly damaging cracks in the thermoplastic film.

The molecular weight of the polymer plasticizing additives must be high enough for the migrations of these plasticizers to the curing membrane or/and the adjacent self-sealing layer to be limited as much as possible during the tyre crosslinking phase. When the molecular weight becomes greater than 2000 g/mol, it is observed that the diffusion of the plasticizing additives becomes slow enough to no longer damage the mechanical strength of the films, on the other hand, when the molecular weight becomes greater than 10 000 g/mol, the plasticizing additives no longer correctly fulfil their role as a plasticizer of the thermoplastic film.

Preferably, the chlorinated thermoplastic film also comprises at least one secondary additive chosen from the group of tin salts, calcium salts, barium salts, zinc salts, perchlorates, amines and mixtures thereof.

These secondary additives are heat stabilizers of the thermoplastic film and very substantially slow down the thermal degradation kinetics of the chlorinated film. The metal salts mentioned may advantageously be used with epoxidized oils.

The chlorinated thermoplastic film may also comprise an additive chosen from the group of phthalates and adipates, but the content of these additives must be low, preferably less than 2% by weight.

Advantageously, the number-average molecular weight ($M_n$) of the chlorinated thermoplastic polymer is greater than 50 000 g/mol. This polymer thus has a very high molecular weight, which reduces the number of labile functions and improves the high-temperature resistance of the film.

The chlorinated thermoplastic polymer may be chosen from the group of polyvinyl chloride (PVC), polyvinylidene chloride (PVDC) and chlorinated polyvinyl chloride (CPVC).

The thickness of the protective film may be between 7 and 50 micrometers and preferably between 10 and 30 micrometers.

The latter point is important. This is because it has been observed that when a film has an insufficient thickness, of less than 7 μm for example, the appearance of cracks can be observed during the shaping phase of the pneumatic tyre, the first phase of its manufacture. Such a chlorinated thermoplastic film must have a thickness greater than or equal to 10 μm to withstand this first manufacturing phase.

Such films may, however, be used by applying them during the second phase of manufacturing the tyre, the finishing phase just before vulcanization.

As described previously, such thermoplastic films make it possible to build the pneumatic tyre while eliminating all the problems linked to the intrinsically very high tack of the self-sealing layers. The protective film acts as a separation between the self-sealing layer on the one hand and the assembly drum then the curing membrane on the other hand.

These formulations of films must nevertheless have, so as to be able to be used as protective films, the following features:
- a stress relative to the initial cross section in uniaxial extension at 100% strain and at ambient temperature of the film of less than 20 MPa; for thicknesses of the order of 10 to 30 micrometers, these films are readily stretchable at ambient temperature and thus do not disturb the steps of shaping and placing in the curing mould of the pneumatic tyre;
- an elongation at break of greater than 90% in uniaxial extension and preferably greater than 150% at ambient temperature; the film may withstand all of the stresses during the manufacture of the pneumatic tyre without tearing or breaking; and
- the thermoplastic film must be able to withstand a rise in temperature up to around 170 to 175° C. for about ten minutes without significant modifications of its properties and of its composition in order to fulfil its role in the case of a pneumatic tyre of a passenger vehicle.

A person skilled in the art will know how to adjust the composition of the protective film so as to attain the required property levels.

According to one preferred embodiment, the chlorinated thermoplastic film is the only polymer constituent of the thermoplastic protective film.

According to one embodiment of the invention, the self-sealing layer may comprise at least (phr signifying parts by weight per 100 parts of solid elastomer) one thermoplastic styrene (TPS) elastomer and more than 200 phr of an extender oil of said elastomer.

The TPS may be the predominant elastomer of the self-sealing layer.

The TPS elastomer may be chosen from the group constituted by styrene/butadiene/styrene (SBS), styrene/isoprene/styrene (SIS), styrene/isoprene/buta-diene/styrene (SIBS), styrene/ethylene/butylene/styrene (SEBS), styrene/ethylene/propylene/styrene (SEPS), and styrene/ethylene/ethylene/propylene/styrene (SEEPS) block copolymers and mixtures of these copolymers.

Advantageously, the TPS elastomer is chosen from the group constituted by SEBS copolymers, SEPS copolymers and mixtures of these copolymers.

According to another embodiment, the self-sealing layer may comprise at least:
(a) as predominant elastomer, an unsaturated diene elastomer;
(b) between 30 and 90 phr of a hydrocarbon resin;
(c) a liquid plasticizer, the $T_g$ (glass transition temperature) of which is below −20° C., at a weight content between 0 and 60 phr; and
(d) from 0 to less than 30 phr of a filler.

The unsaturated diene elastomer is advantageously chosen from the group constituted by polybutadienes, natural rubber, synthetic polyisoprenes, butadiene copolymers, isoprene copolymers and mixtures of such elastomers.

The unsaturated diene elastomer may advantageously be an isoprene elastomer, preferably chosen from the group constituted by natural rubber, synthetic polyisoprenes and mixtures of such elastomers.

Advantageously, the content of unsaturated diene elastomer is greater than 50 phr, preferably greater than 70 phr.

BRIEF DESCRIPTION OF THE DRAWINGS

All the embodiment details are given in the following description, which is supplemented by FIGS. 1 to 3, in which.

DETAILED DESCRIPTION OF EMBODIMENTS OF THE INVENTION

Figure 1:
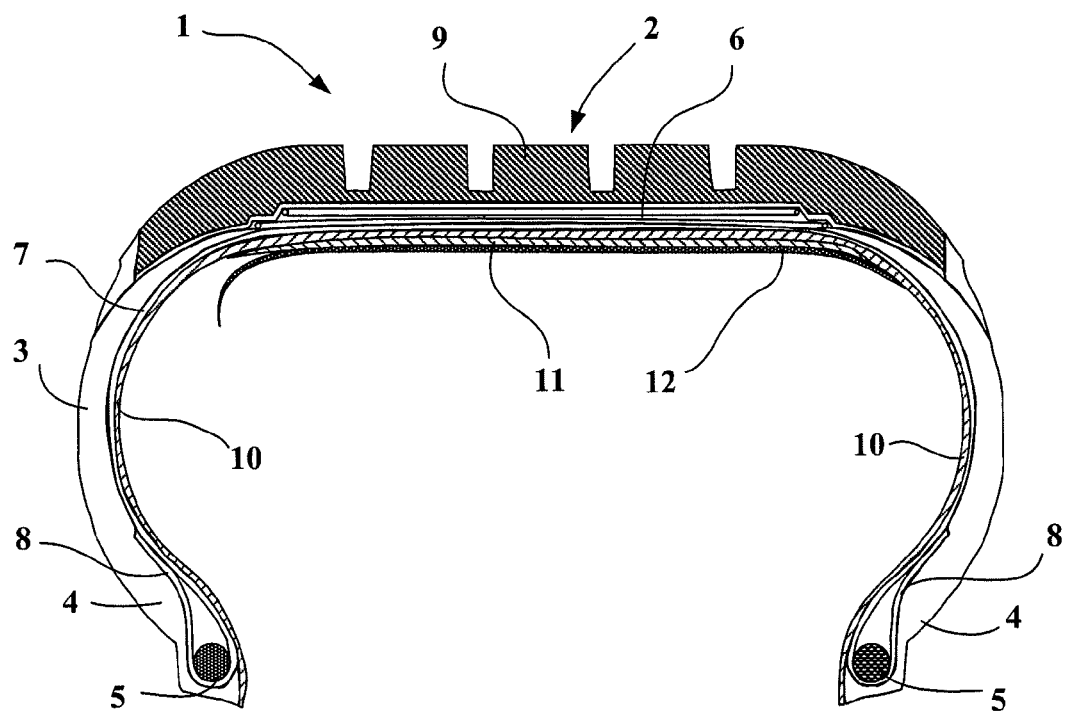
FIG. 1 represents, very schematically (not to a specific scale), a radial cross section of a pneumatic tyre in accordance with one embodiment of the invention.

FIG. 1 schematically represents a radial cross section of a pneumatic tyre or tyre incorporating a self-sealing layer with a protective layer according to one embodiment of the invention.

This tyre 1 comprises a crown 2 reinforced by a crown reinforcement or belt 6, two sidewalls 3 and two beads 4, each of these beads 4 being reinforced with a bead wire 5. The crown reinforcement 6 is surmounted radially on the outside by a rubbery tread 9. A carcass reinforcement 7 is wound around the two bead wires 5 in each bead 4, the upturn 8 of this reinforcement 7 lying for example towards the outside of the tyre 1. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the circumferential mid-plane (the plane perpendicular to the rotational axis of the tyre, which is located at mid-distance of the two beads 4 and passes through the middle of the crown reinforcement 6). An airtight layer 10 extends from one bead to the other radially on the inside relative to the carcass reinforcement 7.

The tyre 1 is such that its inner wall includes a self-sealing layer 11. In accordance with a preferred embodiment of the invention, the self-sealing layer 11 covers the airtight layer 10 in the region of the crown 2 of the pneumatic tyre. The self-sealing layer may also extend from the crown region to mid-points of the sidewalls (equators) of the pneumatic tyre, or even beyond. The self-sealing layer 11 is covered radially on the inside with a protective layer 12.

The protective layer 12 is a thermoplastic film constituted of a chlorinated polymer. By way of example, such a film may be a film having a thickness of 8 micrometers produced from the raw material Triolin from Linpac.

The protective layer 12 makes it possible for the self-sealing layer to avoid any contact with the drum for manufacturing the pneumatic tyre then with the curing membrane of the vulcanization mould.

The main constituent of the thermoplastic film of the protective layer is a chlorinated polymer. The best known of these polymers is polyvinyl chloride or PVC. Polyvinylidene chloride (PVDC) is the homopolymer of vinylidene chloride and may be suitable, preferably as a blend with PVC. It is also possible to use chlorinated PVC or CPVC, which contains from 65% to 69% of chlorine (instead of 56% for PVC).

For an application as a protective layer, it is preferable to use a polymer of high molecular weight, in particular greater than 50 000 g/mol. This increases the high-temperature resistance of the resulting film.

The glass transition temperature of pure PVC is of the order of 75 to 105° C. depending on the grades. It is therefore necessary to add plasticizing additives to the PVC or other polymer in order to lower this glass transition temperature to below room temperature and to obtain films that are extensible over the entire range of operating temperatures.

The use as a protective layer calls for a possibility of use at high temperatures, the high temperatures of the crosslinking of the pneumatic tyres, and for a duration of several minutes.

The following plasticizers are favourable for such a use at high temperature: polymer additives, epoxidized oils, mellitates and triallyl cyanurate.

Several polymer additives below may be used as plasticizers.

In particular, these are ethylene/vinyl acetate or EVA copolymers and vinyl chloride/vinyl acetate or VC/VA copolymers.

Examples of VC/VA copolymers that can be used are copolymers with a vinyl chloride content of the order of 80 to 90% in order to obtain a good flexibility.

It is also possible to use polybutenes, which are copolymers of isoprene and of isobutylene, and polyesters based on fatty acids.

These polymer plasticizing additives preferably have a molecular weight between 2000 and 10 000 g/mol in order to retain good plasticization properties while being virtually unsusceptible to migration at high temperature. Their contents may vary between 5 and 30 parts per hundred parts by weight of chlorinated polymer.

Mellitates may also be used as plasticizers, among these mention is especially made of trimellitates and pyromellitates. Their usage content may range up to 120 parts.

Triallyl cyanurate may also be used for its high-temperature stabilization properties.

It is also possible to use, as plasticizers, epoxidized oils, especially soybean or linseed oils at contents of between 5 and 15 parts.

Finally, it is possible to use, as plasticizers, crosslinkable acrylic compounds.

Preferably, the chlorinated thermoplastic film also comprises a secondary additive chosen from the group of tin salts, calcium salts, barium salts, zinc salts, perchlorates, amines and mixtures thereof.

These secondary additives are heat stabilizers of the thermoplastic film and very substantially slow down the thermal degradation kinetics of the chlorinated film. The metal salts mentioned may advantageously be used with epoxidized oils.

These secondary additives are used at contents of between 0.1 and 5 parts.

The chlorinated thermoplastic film may also comprise a standard additive chosen from the group of phthalates and adipates, but the content of these additives must be low, preferably less than 1% by weight in order to limit migration phenomena during the crosslinking of the pneumatic tyre.

According to one embodiment, the self-sealing layer 11 comprises a thermoplastic styrene (TPS) elastomer and more than 200 phr of an extender oil of the elastomer. The thermoplastic styrene elastomers are thermoplastic elastomers that are in the form of block copolymers based on styrene.

Having a structure intermediate between thermoplastic polymers and elastomers, they consist, as is known, of hard polystyrene units connected by flexible elastomer, for example polybutadiene, polyisoprene or poly(ethylene/butylene) units. These are often triblock elastomers with two hard segments connected by a soft segment. The hard and soft segments may be arranged linearly, in a star shape or in a branched manner.

The TPS elastomer is chosen from the group constituted by styrene/butadiene/styrene (SBS), styrene/isoprene/styrene (SIS), styrene/isoprene/buta-diene/styrene (SIBS), styrene/ethylene/butylene/styrene (SEBS), styrene/ethylene/propylene/styrene (SEPS), and styrene/ethylene/ethylene/propylene/styrene (SEEPS) block copolymers and mixtures of these copolymers.

More preferably, the elastomer is chosen from the group constituted by SEBS copolymers, SEPS copolymers and mixtures of these copolymers.

The TPS elastomer may constitute the whole of the elastomer matrix or the majority by weight (preferably more than 50%, more preferably more than 70%) of the latter when it comprises one or more other elastomer(s), which are thermoplastic or non-thermoplastic elastomers, for example of diene type.

Examples of such self-sealing layers and of their properties are disclosed in documents FR 2 910 382, FR 2 910 478 and FR 2 925 388.

Such a self-sealing layer may be preformed by extrusion of a flat profiled element to the dimensions suitable for its application onto a building drum. One exemplary embodiment is presented in document FR 2 925 388.

According to another exemplary embodiment, the self-sealing layer 11 consists of an elastomer composition comprising at least, as predominant elastomer (preferably with a content of more than 50 phr), an unsaturated diene elastomer, between 30 and 90 phr of a hydrocarbon resin and a liquid plasticizer, of $T_g$ below $-20°$ C., with a content of between 0 and 60 phr (phr denoting parts by weight per hundred parts of solid elastomer). It has another essential feature of containing no filler or, at the very most, containing less than 30 phr thereof.

The term "diene" elastomer or rubber should be understood, as is known, to mean an elastomer (i.e. a homopolymer or a copolymer) at least partly obtained from diene monomers (i.e. monomers containing two carbon-carbon double bonds, whether conjugated or not).

These diene elastomers may be put into two categories, namely saturated and unsaturated. In the present application, the term "unsaturated" (or "essentially unsaturated") diene elastomer is understood to mean a diene elastomer that is at least partly obtained from conjugated diene monomers and having a content of units obtained from conjugated dienes of greater than 30 mol %. Thus, excluded from this definition are diene elastomers such as butyl rubbers or copolymers of dienes and alpha-olefins, of the EPDM type, which may be termed "saturated" or "essentially saturated" diene elastomers because of their low content of units of diene origin (always less than 15 mol %).

It is preferred to use an unsaturated diene elastomer with a content (in mol %) of units of diene origin (conjugated dienes) of greater than 50%, such a diene elastomer being more preferably chosen from the group formed by polybutadienes (BR), natural rubber (NR), synthetic polyisoprenes (IR), butadiene copolymers (for example styrene-butadiene rubber or SBR), isoprene copolymers (of course, other than butyl rubber) and blends of such elastomers.

Compared with diene elastomers of the liquid type, the unsaturated diene elastomer of the composition is by definition a solid. Preferably, its number-average molecular weight ($M_n$) is between 100 000 and 5 000 000, more preferably between 200 000 and 4 000 000 g/mol. The $M_n$ value is determined in a known manner, for example by SEC: tetrahydrofuran solvent; 35° C. temperature; 1 g/l concentration; 1 ml/min flow rate; solution filtered on a filter of 0.45 μm porosity before injection; Moore calibration using standards (polyisoprene); set of four WATERS columns in series ("STYRAGEL" HMW7, HMW6E, and 2 HT6E); differential refractometer (WATERS 2410) detection and its associated operating software (WATERS EMPOWER).

More preferably, the unsaturated diene elastomer of the composition of the self-sealing layer is an isoprene elastomer. The term "isoprene elastomer" is understood to mean, as is known, an isoprene homopolymer or copolymer, in other words a diene elastomer chosen from the group formed by natural rubber (NR), synthetic polyisoprenes (IR), butadiene-isoprene copolymers (BIR), styrene-isoprene copolymers (SIR), styrene-butadiene-isoprene copolymers (SBIR) and blends of these elastomers.

This isoprene elastomer is preferably natural rubber or a synthetic cis-1,4-polyisoprene. Among these synthetic polyisoprenes, those having a content (in mol %) of cis-1,4 bonds of greater than 90%, more preferably still greater than 95%, especially greater than 98%, are preferably used.

The above unsaturated diene elastomer, especially an isoprene elastomer such as natural rubber, may constitute all of the elastomer matrix or the predominant amount by weight (preferably comprising more than 50%, more preferably more than 70%) of said matrix when it contains one or more other diene elastomers or non-diene elastomers, for example of the thermoplastic elastomer type. In other words, and preferably, in the composition, the content of unsaturated (solid) diene elastomer, especially of isoprene elastomer such as natural rubber, is greater than 50 phr, more preferably greater than 70 phr. More preferably still, this content of unsaturated diene elastomer, especially of isoprene elastomer such as natural rubber, is greater than 80 phr.

According to one particular embodiment, the above unsaturated diene elastomer, especially when it is an isoprene diene elastomer such as natural rubber, is the sole elastomer present in the self-sealing composition. However, it could also, according to other possible embodiments, be combined with other (solid) elastomers in a minor content by weight, whether these be unsaturated diene elastomers (for example BR or SBR) or even saturated diene elastomers (for example butyl), or else elastomers other than diene elastomers, for example thermoplastic styrene (TPS) elastomers, for example chosen from the group formed by styrene/butadiene/styrene (SBS), styrene/isoprene/styrene (SIS), styrene/butadiene/isoprene/styrene (SBIS), styrene/isobutylene/styrene (SIBS), styrene/ethylene/butylene/styrene (SEBS), styrene/ethylene/propylene/styrene (SEPS), styrene/ethylene/ethylene/propylene/styrene (SEEPS) block copolymers and blends of these copolymers.

Surprisingly, this unsaturated diene elastomer, unfilled (or very lightly filled), has proved to be capable, after a thermoplastic hydrocarbon resin has been added in the recommended narrow range, of fulfilling the function of a highly effective self-sealing composition, as will be explained in detail in the rest of the description.

The second essential constituent of the self-sealing composition is a hydrocarbon resin.

The term "resin" is reserved in the present application, by definition, as known to those skilled in the art, to a compound that is solid at room temperature (23° C.), as opposed to a liquid plasticizer compound such as an oil.

Hydrocarbon resins are polymers well known to those skilled in the art, essentially based on carbon and hydrogen, which can be used in particular as plasticizing agents or tackifiers in polymeric matrices. They are by nature miscible (i.e. compatible) in the contents used with the polymer compositions for which they are intended, so as to act as true diluents. They have been described for example in the work entitled "Hydrocarbon Resins" by R. Mildenberg, M. Zander and G. Collin (New York, VCH, 1997, ISBN 3-527-28617-9), Chapter 5 of which is devoted to their applications, especially in rubber tyres (5.5. "Rubber Tires and Mechanical Goods").

They may be aliphatic, cycloaliphatic, aromatic, hydrogenated aromatic, of the aliphatic/aromatic type, i.e. based on aliphatic and/or aromatic monomers. They may be natural or synthetic resins, whether or not based on petroleum (if such is the case, they are also known as petroleum resins).

Their glass transition temperature ($T_g$) is preferably above 0° C., especially above 20° C. (usually between 30° C. and 95° C.).

As is known, these hydrocarbon resins may also be termed thermoplastic resins in the sense that they soften when heated and may thus be moulded. They may also be defined by a softening point or temperature, at which temperature the product, for example in powder form, cakes together. This softening point tends to replace the melting point, which is quite poorly defined, of resins in general. The softening point of a hydrocarbon resin is generally about 50 to 60° C. higher than the $T_g$ value.

In the composition of the self-sealing layer, the softening point of the resin is preferably above 40° C. (in particular between 40° C. and 140° C.), more preferably above 50° C. (in particular between 50° C. and 135° C.).

Said resin is used in an amount by weight of between 30 and 90 phr. Below 30 phr, the puncture-resistance performance has proved to be insufficient because of excessive stiffness of the composition, whereas above 90 phr, the material has insufficient mechanical strength with, in addition, a risk of its performance being degraded at high temperature (typically above 60° C.). For these reasons, the resin content is preferably between 40 and 80 phr, more preferably still at least equal to 45 phr, especially in the 45 to 75 phr range.

According to a preferred embodiment of the self-sealing layer, the hydrocarbon resin has at least (any) one, and more preferably all, of the following characteristics:
a $T_g$ above 25° C.;
a softening point above 50° C. (in particular between 50° C. and 135° C.);
a number-average molecular weight ($M_n$) of between 400 and 2000 g/mol; and
a polydispersity index ($I_p$) of less than 3 (it will be recalled that $I_p=M_w/M_n$, where $M_w$ is the weight-average molecular weight).

More preferably, this hydrocarbon resin has at least (any) one, and more preferably all, of the following characteristics:
a $T_g$ of between 25° C. and 100° C. (especially between 30° C. and 90° C.);
a softening point above 60° C., in particular between 60° C. and 135° C.;
a number-average molecular weight $M_n$ of between 500 and 1500 g/mol; and
a polydispersity index $I_p$ of less than 2.

The $T_g$ is measured according to the ASTM D3418 (1999) standard. The softening point is measured according to the ISO 4625 standard ("Ring and Ball" method). The macrostructure ($M_w$, $M_n$ and $I_p$) is determined by size exclusion chromatography (SEC): tetrahydrofuran solvent; 35° C. temperature; 1 g/l concentration; 1 ml/min flow rate; solution filtered on a filter of 0.45 μm porosity before injection; Moore calibration using polystyrene standards; set of three WATERS columns in series ("STYRAGEL" HR4E, HR1 and HR0.5); differential refractometer (WATERS 2410) detection and its associated operating software (WATERS EMPOWER).

As examples of such hydrocarbon resins, mention may be made of those chosen from the group formed by cyclopentadiene (abbreviated to CPD) or dicyclopentadiene (abbreviated to DCPD) homopolymer or copolymer resins, terpene homopolymer or copolymer resins, $C_5$-cut homopolymer or copolymer resins and blends of these resins. Among the above copolymer resins, mention may more particularly be made of those chosen from the group formed by (D)CPD/vinylaromatic copolymer resins, (D)CPD/terpene copolymer resins, (D)CPD/$C_5$-cut copolymer resins, terpene/vinylaromatic copolymer resins, $C_5$-cut/vinylaromatic copolymer resins and blends of these resins.

The term "terpene" includes here, as is known, alpha-pinene, beta-pinene and limonene monomers. It is preferable to use a limonene monomer, a compound which, as is known, can take the form of three possible isomers: L-limonene (laevogyratory enantiomer), D-limonene (dextrogyratory enantiomer), or else dipentene (the racemic mixture of the dextrogyratory and laevogyratory enantiomers). Suitable vinylaromatic monomers are for example: styrene, alpha-methylstyrene, ortho-methylstyrene, meta-methylstyrene and para-methylstyrene, vinyltoluene, para-tert-butylstyrene, methoxystyrenes, chlorostyrenes, hydroxystyrenes, vinylmesitylene, divinylbenzene, vinylnaphthalene and any vinylaromatic monomer derived from a $C_9$-cut (or more generally a $C_8$- to $C_{10}$-cut).

More particularly, mention may be made of resins chosen from the group formed by (D)CPD homopolymer resins, (D)CPD/styrene copolymer resins, polylimonene resins, limonene/styrene copolymer resins, limonene/D(CPD) copolymer resins, $C_5$-cut/styrene copolymer resins, $C_5$-cut/$C_9$-cut copolymer resins and blends of these resins.

All the above resins are well known to those skilled in the art and are commercially available, for example sold by DRT under the name "Dercolyte" as regards polylimonene resins, sold by Neville Chemical Company under the name "Super Nevtac" or sold by Kolon under the name "Hikorez" as regards $C_5$-cut/styrene resins or $C_5$-cut/$C_9$-cut resins, or else by Struktol under the name "40 MS" or "40 NS" or by Exxon Mobil under the name "Escorez" (which are blends of aromatic and/or aliphatic resins).

The self-sealing composition has the essential feature of further comprising, with a content of less than 60 phr (in other words between 0 and 60 phr), a plasticizing agent which is liquid (at 23° C.) called a "low $T_g$" plasticizing agent, the function of which is especially to soften the matrix by diluting the diene elastomer and the hydrocarbon resin, in particular improving the "cold" self-sealing performance (that is to say the performance typically for a temperature below 0° C.). Its $T_g$ is by definition below −20° C. and is preferably below −40° C.

Any liquid elastomer, or any extender oil, whether of aromatic or non-aromatic nature, or more generally any liquid plasticizing agent known for its plasticizing properties with respect to elastomers, especially diene elastomers, can be used. At room temperature (23° C.), these plasticizers or oils, which are relatively viscous, are liquids (that is to say, as a reminder, substances having the capability of eventually adopting the form of their container), as opposed, in particular, to hydrocarbon resins which by their nature are solids at room temperature.

Particularly suitable are liquid elastomers having a low number-average molecular weight ($M_n$) of typically between 300 and 90 000, more generally between 400 and 50 000, for example in the form of liquid BR, liquid SBR, liquid IR or depolymerized natural rubber, as described for example in the patent documents U.S. Pat. No. 4,913,209, U.S. Pat. No. 5,085,942 and U.S. Pat. No. 5,295,525. Blends of such liquid elastomers with oils as described below may also be used.

Also suitable are extender oils, especially those chosen from the group formed by polyolefin oils (i.e. those resulting from the polymerization of olefins, monoolefins or diolefins), paraffinic oils, naphthenic oils (of low or high viscosity, and hydrogenated or non-hydrogenated), aromatic or DAE (distillate aromatic extract) oils, MES (medium extracted solvate) oils, TDAE (treated distillate aromatic extract) oils, mineral oils, vegetable oils (and oligomers thereof, e.g. rapeseed, soybean or sunflower oils) and mixtures of these oils.

According to one particular embodiment, a polybutene-type oil may for example be used, in particular a polyisobutylene (PIB) oil, which has exhibited an excellent compromise of properties in comparison with the other oils tested, especially a conventional paraffinic oil. As examples, PIB oils are sold in particular by Univar under the name "Dynapak Poly" (e.g. "Dynapak Poly 190"), by BASF under the name "Glissopal" (e.g. "Glissopal 1000") or "Oppanol" (e.g. "Oppanol B12"); paraffinic oils are sold for example by Exxon under the name "Telura 618" or by Repsol under the name "Extensol 51".

Also suitable, as liquid plasticizers, are ether, ester, phosphate and sulphonate plasticizers, more particularly those chosen from esters and phosphates. As preferred phosphate plasticizers, mention may be made of those that contain between 12 and 30 carbon atoms, for example trioctyl phosphate. As preferred ester plasticizers, mention may in particular be made of compounds chosen from the group formed by trimellitates, pyromellitates, phthalates, 1,2-cyclohexane dicarboxylates, adipates, azelates, sebacates, glycerol triesters and mixtures of these compounds. Among the above triesters, mention may be made as preferred glycerol triesters of those that predominantly comprise (for more than 50% and more preferably for more than 80% by weight) a $C_{18}$ unsaturated fatty acid, that is to say a fatty acid chosen from the group formed by oleic acid, linoleic acid, linolenic acid and mixtures of these acids. More preferably, the fatty acid used, whether of synthetic or natural origin (the case, for example, of sunflower or rapeseed vegetable oils), is composed of, for more than 50% by weight and even more preferably for more than 80% by weight, oleic acid. Such triesters (trioleates) having a high oleic acid content are well known—they have been described for example in application WO 02/088238 (or US 2004/0127617)—as plasticizing agents in tyre treads.

The number-average molecular weight ($M_n$) of the liquid plasticizer is preferably between 400 and 25 000 g/mol, more preferably still between 800 and 10 000 g/mol. For excessively low $M_n$ values, there is a risk of the plasticizer migrating to the outside of the composition, whereas excessively high $M_n$ values may result in this composition becoming too stiff. An $M_n$ value between 1000 and 4000 g/mol proves to be an excellent compromise for the intended applications, in particular for use in a pneumatic tyre.

The number-average molecular weight ($M_n$) of the plasticizer may be determined in a known manner, especially by SEC, the specimen being firstly dissolved in tetrahydrofuran to a concentration of about 1 g/l and then the solution is filtered on a filter of 0.45 μm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the trade name "STYRAGEL HT6E" is used. The injected volume of the polymer specimen solution is 100 μl. The detector is a WATERS 2410 differential refractometer and its associated software for handling the chromatograph data is the WATERS MILLENIUM system. The calculated average molecular weights are relative to a calibration curve obtained with polystyrene standards.

To summarize, the liquid plasticizer is preferably chosen from the group formed by liquid elastomers, polyolefin oils, naphthenic oils, paraffinic oils, DAE oils, MES oils, TDAE oils, mineral oils, vegetable oils, ether plasticizers, ester plasticizers, phosphate plasticizers, sulphonate plasticizers and mixtures of these compounds. More preferably, this liquid plasticizer is chosen from the group formed by liquid elastomers, polyolefin oils, vegetable oils and mixtures of these compounds.

A person skilled in the art will be able, in the light of the description and the exemplary embodiments that follow, to adjust the amount of liquid plasticizer according to the particular usage conditions of the self-sealing composition, especially of the pneumatic tyre in which it is intended to be used.

Preferably, the liquid plasticizer content is in the 5 to 40 phr range, more preferably in the 10 to 30 phr range. Below the indicated minima, the elastomer composition runs the risk of being too stiff for certain applications, whereas above the recommended maxima there is a risk of insufficient cohesion of the composition and of degraded self-sealing properties.

The composition of the self-sealing layer has the essential feature of being unfilled or only very lightly filled, that is to say containing from 0 to less than 30 phr of filler.

The term "filler" is understood here to mean any type of filler, whether reinforcing (typically nanoparticles with a weight-average size preferably of less than 500 nm, especially between 20 and 200 nm) or whether non-reinforcing or inert (typically microparticles with a weight-average size of greater than 1 μm, for example between 2 and 200 μm).

These fillers, whether reinforcing or not, are essentially there only to give the final composition dimensional stability, i.e. the minimum mechanical integrity required. When the filler is known to be reinforcing vis-à-vis an elastomer, especially an isoprene elastomer such as natural rubber, it is preferable to use an even smaller amount thereof in the composition.

Too high an amount, especially more than 30 phr, no longer makes it possible to achieve the minimum required flexibility, deformability and flow properties. For these reasons, the composition preferably contains 0 to less than 20 phr, more preferably 0 to less than 10 phr, of filler.

As examples of fillers known to those skilled in the art as reinforcing fillers, mention will in particular be made of carbon black nanoparticles or a reinforcing inorganic filler, or a blend of these two types of filler.

For example, as carbon blacks, all carbon blacks, especially blacks of the HAF, ISAF, SAF and GPF types that are conventionally used in tyres (these being called tyre-grade blacks), are suitable. Among such blacks, the following will more particularly be mentioned: carbon blacks of the 300, 600 or 700 (ASTM) grade (for example the blacks N326, N330, N347, N375, N683 and N772). Suitable reinforcing inorganic fillers are especially mineral fillers of the silica ($SiO_2$) type, especially precipitated or pyrogenic silica having a BET surface area of less than 450 $m^2/g$, preferably from 30 to 400 $m^2/g$.

As examples of fillers known to those skilled in the art as non-reinforcing or inert fillers, the following will especially be mentioned: microparticles of natural calcium carbonate (chalk) or synthetic calcium carbonate, synthetic or natural silicates (such as kaolin, talc or mica), milled silicas, titanium oxides, aluminas or even aluminosilicates. As examples of platy fillers, graphite particles may also be mentioned. Colouring or coloured fillers could be advantageously used to colour the composition according to the desired colour.

The physical state of the filler does not matter—it could be in the form of powder, microspheres, granules or beads, or any other suitable densified form. Of course, the term "filler" is also understood to mean mixtures of various reinforcing and/or non-reinforcing fillers.

A person skilled in the art will know, in the light of the present description, how to adjust the formulation of the self-sealing composition so as to achieve the desired property levels and to adapt the formulation to the envisaged specific application.

According to one particular advantageous embodiment, if a reinforcing filler is present in the self-sealing composition, its content is preferably less than 5 phr (i.e. between 0 and 5 phr), in particular less than 2 phr (i.e. between 0 and 2 phr). Such contents have proved to be particularly favourable to the process for manufacturing the composition, while still providing it with excellent self-sealing performance. More preferably a content between 0.5 and 2 phr is used, particularly when the filler is carbon black.

The base constituents of the self-sealing layer described above, namely the unsaturated diene elastomer, the hydrocarbon plasticizing resin, the liquid plasticizer and the optional filler, are sufficient in themselves for the self-sealing composition to completely fulfil its puncture-resistance function within the pneumatic tyres in which it is used.

However, various other additives may be added, typically in a small amount (preferably with contents of less than 20 phr, more preferably less than 15 phr), such as for example protective agents, such as UV stabilizers, antioxidants or antiozonants, various other stabilizers, and colouring agents that can be advantageously used to colour the self-sealing composition. Depending on the intended application, fibres, in the form of short fibres or pulp, could optionally be added to give the self-sealing composition greater cohesion.

According to a preferred embodiment, the self-sealing composition further includes a system for crosslinking the unsaturated diene elastomer. This crosslinking system is preferably a sulphur-based crosslinking system, in other words what is called a "vulcanization" system.

Preferably, the sulphur-based vulcanization system includes, as vulcanization activator, a guanidine derivative, i.e. a substituted guanidine. Substituted guanidines are well known to those skilled in the art (see for example WO 00/05300) and non-limiting examples that may be mentioned include: N,N'-diphenylguanidine (abbreviated to DPG), triphenylguanidine or else di-o-tolylguanidine. Preferably, DPG is used.

In this vulcanization system, to obtain optimum self-sealing performance the sulphur content is preferably between 0.1 and 1.5 phr, in particular between 0.2 and 1.2 phr (for example between 0.2 and 1.0 phr) and the guanidine derivative content is itself between 0 and 1.5 phr, in particular between 0 and 1.0 phr (especially in the 0.2 to 0.5 phr range).

Said system does not require a vulcanization accelerator to be present. According to a preferred embodiment, the composition may therefore contain no such accelerator, or at the very most it may contain less than 1 phr, more preferably less than 0.5 phr, thereof. If such an accelerator is used, examples that may be mentioned include any compound (primary or secondary accelerator) capable of acting as a vulcanization accelerator for diene elastomers in the presence of sulphur, especially accelerators of the thiazole type and derivatives thereof, accelerators of the thiuram and zinc dithiocarbamate types. According to another advantageous embodiment, the above vulcanization system may contain no zinc or zinc oxide (these being known as vulcanization activators).

According to another possible embodiment of the self-sealing layer, a sulphur donor may also be used instead of sulphur itself. Sulphur donors are well known to those skilled in the art. Typically, the amount of such a sulphur donor will preferably be adjusted to be between 0.5 and 10 phr, more preferably between 1 and 5 phr, so as to achieve the preferred equivalent sulphur contents indicated above.

After curing, a vulcanization system as described above gives the composition sufficient cohesion, without truly vulcanizing it: the amount of crosslinking, which can be measured using a conventional swelling method known to those skilled in the art, is in fact close to the detection threshold.

Apart from the elastomers described above, the self-sealing composition could also contain, again as a minor weight fraction relative to the unsaturated diene elastomer, polymers other than elastomers such as, for example, thermoplastic polymers compatible with the unsaturated diene elastomer.

The composition of the self-sealing layer described above may be manufactured by any appropriate means, for example by compounding and/or kneading in blade mixers or open mills, until an intimate homogeneous mixture of its various components has been obtained.

However, the following manufacturing problem may arise: in the absence of any filler, or at least an appreciable amount of filler, the composition is not very cohesive. This lack of cohesion may be such that the tack of the composition, due moreover to the presence of a relatively high hydrocarbon resin content, is not compensated for and causes some of the composition to be carried away—it follows that there is a risk of it sticking undesirably on the compounding tools, which situation may be unacceptable under industrial operating conditions.

To alleviate the above problems, the self-sealing composition, when it includes a vulcanization system, may be prepared using a process comprising the following steps:

a) firstly a masterbatch comprising at least the unsaturated diene elastomer and between 30 and 90 phr of hydrocarbon resin is manufactured, by compounding these various components in a mixer at a temperature or up to a temperature called the "hot compounding temperature" or "first temperature" which is above the softening point of the hydrocarbon resin; and b) then at least the crosslinking system is incorporated into said masterbatch, by compounding everything, in the same mixer or in a different mixer, at a temperature or up to a temperature called the "second temperature" which is maintained below 100° C., in order to obtain said self-sealing composition.

The above first and second temperatures are of course those of the masterbatch and of the self-sealing composition respectively, these being temperatures measurable in situ and not the set temperatures of the mixers themselves.

The term "masterbatch" should be understood here to mean, by definition, the compound comprising at least the diene elastomer and the hydrocarbon resin, namely the precursor compound for the final self-sealing composition, ready to be used.

The liquid plasticizer may be completely or partly incorporated at any moment, especially during the manufacture of the masterbatch itself (in this case, before, during or after incorporation of the hydrocarbon resin into the diene elastomer), "hot" (i.e. at a temperature above the softening point of the resin), or at a lower temperature, or for example after the manufacture of the masterbatch (in this case, before, during or after addition of the crosslinking system).

Optionally, various additives may be incorporated into this masterbatch, whether these are intended for the masterbatch proper (for example a stabilizing agent, a colorant, a UV stabilizer, an antioxidant, etc.) or for the final self-sealing composition for which the masterbatch is intended.

Such a process has proved to be particularly suitable for rapidly manufacturing, under industrially acceptable operating conditions, an effective self-sealing composition, which composition may have high hydrocarbon resin contents without requiring in particular the use of a liquid plasticizer in a particularly high content.

It is during the hot compounding step a) that the diene elastomer is brought into contact with the hydrocarbon resin in order to manufacture the masterbatch. In the initial state, that is to say before it comes into contact with the elastomer, the resin may be in the solid state or in the liquid state. Preferably, for better compounding, the solid diene elastomer is brought into contact with the hydrocarbon resin in the liquid state. To do this, it suffices to heat the resin to a temperature above its softening point. Depending on the type of hydrocarbon resin used, the hot compounding temperature is typically above 70° C., usually above 90° C., for example between 100° C. and 150° C.

It is preferred for the liquid plasticizer to be at least partly introduced during step a) in the manufacture of the masterbatch itself, more preferably in this case either at the same time as the hydrocarbon resin or after the latter has been introduced. According to one particularly advantageous embodiment, the hydrocarbon resin and the liquid plasticizer may be blended together prior to incorporation into the diene elastomer.

Step b) of incorporating the crosslinking system is carried out at a temperature preferably below 80° C., furthermore preferably below the softening point of the resin. Thus, depending on the type of hydrocarbon resin used, the compounding temperature of step b) is preferably below 50° C., more preferably between 20° C. and 40° C.

If necessary, an intermediate step of cooling the masterbatch may be inserted between the above steps a) and b) so as to bring the masterbatch temperature to a value below 100° C., preferably below 80° C., especially below the softening point of the resin, before introduction (step b)) of the crosslinking system into the masterbatch prepared beforehand.

When a filler such as carbon black is used, it may be introduced during step a), i.e. at the same time as the unsaturated diene elastomer and the hydrocarbon resin, or else during step b), i.e. at the same time as the crosslinking system. It has been found that a very small proportion of carbon black, preferably between 0.5 and 2 phr, further improves the compounding and the manufacture of the composition, and also its final extrudability.

Figure 3:
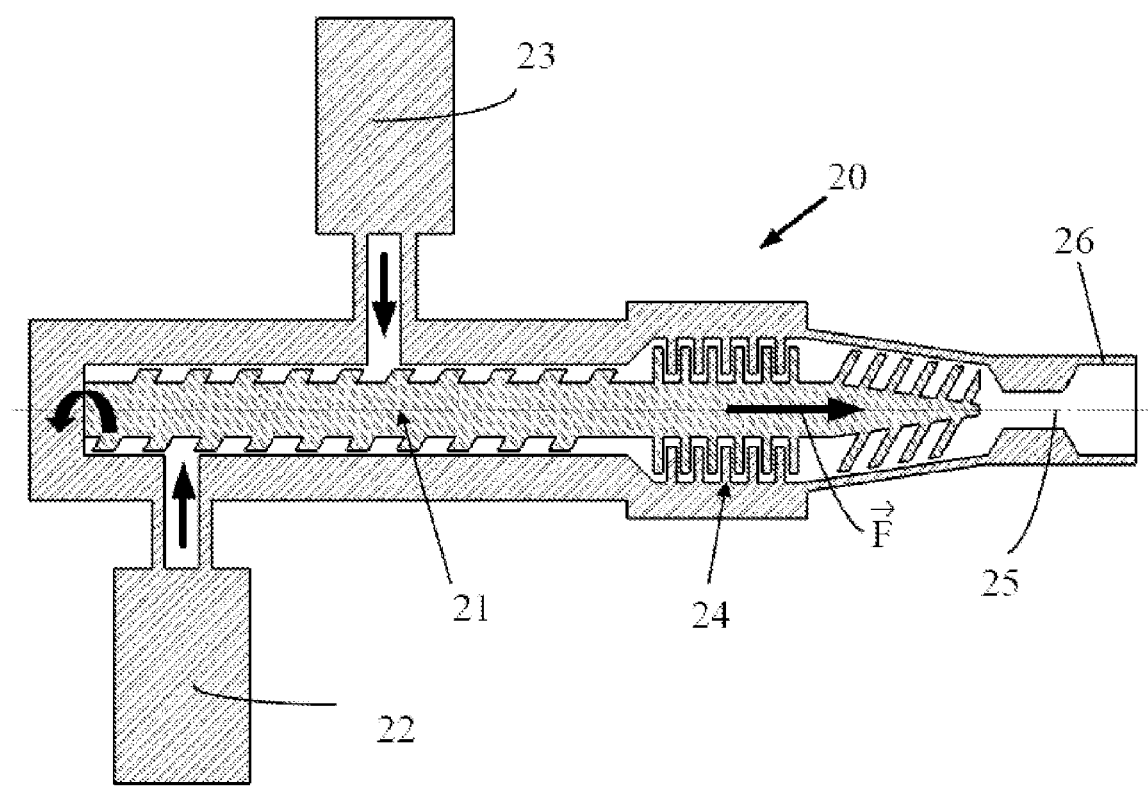
FIG. 3 shows a diagram of a compounding screw extruder.

Step a) of manufacturing the masterbatch is preferably carried out in a compounding screw extruder as shown schematically for example in a simplified manner in FIG. 3.

FIG. 3 shows a compounding screw extruder 20 essentially comprising an extrusion screw (21) (for example a single-screw extruder), a first metering pump 22 for the diene elastomer (which is solid) and at least a second metering pump 23 for the resin (which is solid or liquid) and the liquid plasticizer. The hydrocarbon resin and the liquid plasticizer may be introduced for example by means of a single metering pump, if they have already been mixed beforehand, or else they may be introduced separately by means of a second pump and a third pump (the third pump not being shown in FIG. 3 to simplify the drawing), respectively. The metering pumps 22, 23 are used to raise the pressure while still controlling the metering and the initial characteristics of the materials, the separation of the metering function (for the elastomer, the resin and the liquid plasticizer) from the compounding function furthermore providing better control of the process.

The products, driven by the extrusion screw, are intimately compounded under the very high shear provided by the rotation of the screw, thus progressing through the compounder, for example up to a part 24 called the "chopper-homogenizer", after which zone the final masterbatch 25 thus obtained, progressing in the direction of the arrow F, is finally extruded through a die 26 for extruding the product to the desired dimensions.

The masterbatch thus extruded, ready to be used, is then transferred and cooled, for example on an external mixer of the open mill type for introducing the crosslinking system and the optional filler, the temperature within said external mixer being kept below 100° C., preferably below 80° C. and furthermore being preferably below the softening point of the resin. Advantageously, the rolls of the above open mill are cooled, for example by circulating water, to a temperature below 40° C., preferably to below 30° C., so as to avoid any undesirable sticking of the composition to the walls of the mill.

It is possible for the masterbatch output by the extrusion device 20 to be formed directly, so as to make it easier to transport to and/or place in the external mixer. It is also possible for the external mixer of the open mill type to be continuously fed.

Thanks to the preferred process and specific device described above, it is possible to prepare the composition of the self-sealing layer under satisfactory industrial conditions without running the risk of contaminating the tools due to undesirable sticking of the composition on the walls of the mixers.

The airtight layer 10 (having a thickness of 0.7 to 0.8 mm) in one particular embodiment is based on butyl rubber and has a conventional formulation for an inner liner which usually defines, in a conventional pneumatic tyre, the radially inner face of the tyre intended to protect the carcass reinforcement from the diffusion of air originating from the space inside the pneumatic tyre. This airtight layer 10 therefore allows the pneumatic tyre 1 to be inflated and kept pressurized; its leaktight properties allow it to guarantee a relatively low pressure loss factor, making it possible to keep the tyre inflated, in the normal operating state, for a sufficient duration, normally several weeks or several months.

Figure 2:
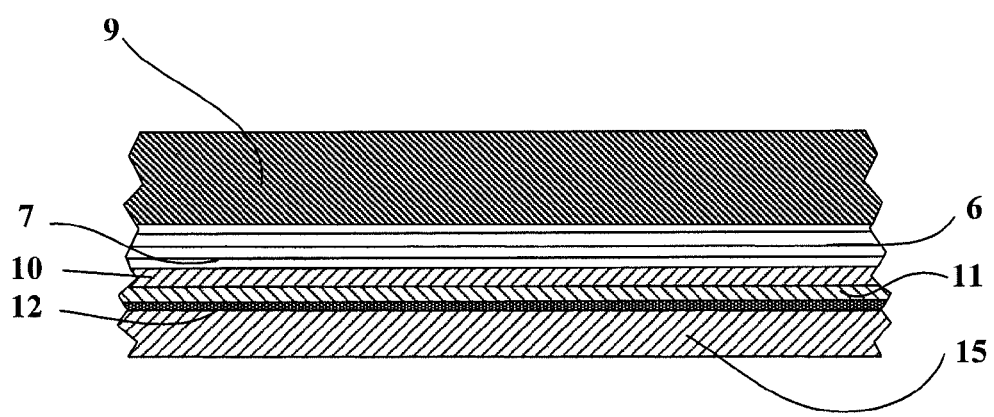
FIG. 2 shows, in partial radial cross section, a tyre blank in accordance with one embodiment of the invention.

The pneumatic tyre from FIG. 1 may be manufactured, as indicated in FIG. 2, by integrating a self-sealing layer 11 into a non-vulcanized blank of a pneumatic tyre 1 using a building drum and the other standard techniques in the manufacture of pneumatic tyres. More specifically, the protective layer 12 positioned radially innermost is applied first to the building drum 15. This protective layer 12 may be wound all the way around the building drum 15 then welded. It is also possible to install a pre-welded protective sleeve. All the other standard components of the pneumatic tyre are then successively applied.

With reference to FIG. 2, the self-sealing layer 11 is positioned directly on the protective layer 12. This layer was first preformed by any known technique, for example extrusion or calendering. Its thickness is preferably greater than 0.3 mm, more preferably between 0.5 and 10 mm (in particular for pneumatic tyres of passenger vehicles between 1 and 5 mm). The airtight layer 10 is then positioned on the self-sealing layer, followed by the carcass ply 7.

In a two-step manufacturing process, the pneumatic tyre blank is then shaped to take the form of a torus. The protective layer 12 consisting of a composition based on a chlorinated thermoplastic polymer film has a sufficiently low stiffness, sufficient uniaxial and biaxial extensibility and is sufficiently bonded to the surface of the self-sealing layer due to the tack of the latter to follow the movements of the pneumatic tyre blank without detaching or tearing.

After the shaping, the crown plies and the tread are positioned on the pneumatic tyre blank. The thus finished blank is placed in a curing mould and is vulcanized. During the vulcanization, the protective layer protects the curing membrane of the mould from any contact with the self-sealing layer.

On exiting the curing mould, the protective layer 12 remains attached to the self-sealing layer 11. This protective layer does not contain any cracks or tears and detaches without any difficulty from the curing membrane.

The pneumatic tyre from FIG. 1 may also be manufactured using a rigid core imposing the shape of the internal cavity of the tyre. In this process, the protective layer is then firstly applied to the surface of the core, then all of the other constituents of the pneumatic tyre are applied. The application to the core is carried out in the order required by the final structure. The constituents of the pneumatic tyre are arranged directly in their final position, without being shaped at any moment of the building operation. This tyre-building operation may especially use the devices described in patent EP 0 243 851 for positioning the threads of the carcass reinforcement, EP 0 248 301 for positioning the crown reinforcements and EP 0 264 600 for positioning rubber compounds. The tyre may be moulded and vulcanized as set out in U.S. Pat. No. 4,895,692. The presence of the protective layer makes it possible, as in the case of the curing membrane, to easily separate the pneumatic tyre from the core at the end of the vulcanization phase.

The self-sealing layer 11 presented in FIG. 1 corresponds to the second embodiment described above. This layer consists of a self-sealing composition comprising the three essential constituents, namely natural rubber (100 phr), about 50 phr of a hydrocarbon resin ("Escorez 2101" from Exxon Mobil, having a softening point of about 90° C.) and about 15 phr of a liquid polybutadiene ("Ricon 154" from Sartomer Cray Valley, having an $M_n$ of about 5200); it also contains a very small amount (1 phr) of carbon black (N772).

The above self-sealing composition was prepared using a single-screw (L/D=40) extruder as shown schematically in FIG. 3 (which has already been commented upon above). The three base constituents (NR, resin and liquid plasticizer) were compounded at a temperature (between 100 and 130° C.) above the softening point of the resin. The extruder used had two different feeds (hoppers) (one for the NR and the other for the resin and the liquid plasticizer which were mixed together beforehand at a temperature of about 130 to 140° C.) and a pressurized liquid injection pump for the resin/liquid plasticizer blend (injected at a temperature of about 100 to 110° C.). When the elastomer, the resin and the liquid plasticizer had thus been intimately compounded, it was found that the undesirable tack of the composition was very significantly reduced.

Similar results were obtained using, as the self-sealing layer, a composition comprising a thermoplastic styrene (TPS) elastomer, as described above.

The above extruder was provided with a die for extruding the masterbatch to the desired dimensions into an external open mill for the final incorporation of the other constituents, namely the vulcanization system based on sulphur (for example 0.5 or 1.2 phr) and DPG (for example 0.3 phr) and carbon black (with a content of 1 phr), at low temperature maintained below +30° C. (by cooling the rolls with circulating water).

The self-sealing layer 11, placed therefore between the airtight layer 10 and the cavity of the tyre, gives the tyre effective protection against loss of pressure due to accidental perforations, enabling these perforations to be automatically sealed off.

If a foreign body, such as a nail, passes through the structure of the pneumatic tyre, for example a wall, such as a sidewall 3 or the crown 2 of the pneumatic tyre 1, the composition serving as self-sealing layer is subjected to several stresses. In reaction to these stresses, and thanks to its advantageous deformability and elasticity properties, said composition creates an airtight contact zone right around the body. It does not matter whether the contour or the profile of said body is uniform or regular, the flexibility of the self-sealing composition enables it to be insinuated into openings of very small size. This interaction between the self-sealing composition and the foreign body seals the zone affected by said body.

In the event of the foreign body being removed, whether accidentally or intentionally, a perforation remains, this being liable to create a relatively large leak, depending on its size. The self-sealing composition, exposed to the hydrostatic pressure, is sufficiently soft and deformable to seal off, by being deformed, the perforation, preventing the inflation gas from leaking. In particular in the case of a pneumatic tyre, it has been shown that the flexibility of the self-sealing composition enables the forces of the surrounding walls to be withstood without any problems, even during phases in which the loaded pneumatic tyre deforms when running.

A particular problem may be encountered during the removal of the foreign body after running for a relatively long time. In such a case, when running, the nail or foreign body is subjected to large stresses which enlarge the size of the initial fissure in the wall of the pneumatic tyre. As a consequence, when the foreign body is removed, the material of the self-sealing layer, pushed by the inflation pressure of the pneumatic tyre, may pass right through the wall of the pneumatic tyre forming a protrusion or plug on the outside. This plug usually seals off the leak satisfactorily but it is very exposed on the outside of the pneumatic tyre and its detachment is capable of leading to the pneumatic tyre gradually or instantaneously going flat. Another consequence of the formation of a plug is to decrease the amount of material of this self-sealing layer on the inside of the pneumatic tyre, which is detrimental to the effectiveness of this layer.

When a thermoplastic film, such as those comprising a chlorinated thermoplastic polymer, is placed on the surface of the self-sealing layer on the side of the internal cavity of the pneumatic tyre, this thermoplastic film mechanically reinforces the self-sealing layer and helps to contain the self-sealing material inside the wall of the pneumatic tyre. The fissure is then not passed through completely by the material of the self-sealing layer and there is no formation of a plug on the outside. The very low stiffness in extension of these protective films enables them to envelop perforating foreign bodies without reducing the effectiveness of the self-sealing layer. Thus, a true synergy is observed between the self-sealing layer and the protective film comprising the chlorinated thermoplastic polymer.

During tests, pneumatic tyres of the passenger car type, of 205/55 R16 size (Michelin, "Energy 3" brand) were tested. These pneumatic tyres have, as described above, a built-in self-sealing layer 11 covered with a protective film 12 comprising a thermoplastic polymer containing PVC of additive-type. The self-sealing layer has a thickness of 3 mm.

On one of the pneumatic tyres, when fitted and inflated, eight perforations 5 mm in diameter were produced through the tread and the crown block on the one hand, and through the sidewalls on the other, using punches that were immediately removed.

Unexpectedly, this tyre withstood being rotated at 150 km/h on a rolling drum under a nominal load of 400 kg without loss of pressure for more than 1500 km, after which distance the rolling was stopped.

On another pneumatic tyre, the test was carried out in the same way but this time leaving the perforating objects in place for one week. The same excellent result was obtained.

Without the self-sealing composition and under the same conditions as above, the pneumatic tyre thus perforated loses its pressure in less than one minute, becoming completely unsuitable for rolling.

Endurance tests were also carried out on pneumatic tyres according to the invention, identical to the previous tyres, but having been run for 750 km, at a speed of 150 km/h, this time leaving the punches in place in their perforations. After the punches had been removed (or after their expulsion as a result of the rolling), these pneumatic tyres of the invention withstood being rotated on a rolling drum without loss of pressure, under the same conditions as previously (distance traveled of 1500 km at a speed of 150 km/h and under a nominal load of 400 kg).

The invention is not limited to the examples described and represented, and various modifications may be made thereto without departing from the scope thereof defined by the appended claims.

The invention claimed is:

1. A pneumatic tire with built-in self-sealing layer, the tire comprising:
   an outer rubbery tread;
   a carcass reinforcement;
   a gastight layer located at an inside position relative to the carcass reinforcement;
   a protective layer; and
   a self-sealing layer adjacent to the protective layer and located at an inside position relative to the gastight layer,
   wherein the protective layer is located innermost relative to the carcass reinforcement, the gastight layer, and the self-sealing layer,
   wherein a thickness of the protective layer is between 7 and 50 micrometers, and
   wherein the protective layer is a film formed of at least a chlorinated thermoplastic polymer that includes a plasticizing additive chosen from the group consisting of ethylene/vinyl acetate copolymers, polybutenes, polyesters, vinyl chloride/vinyl acetate copolymers, mellitates, triallyl cyanurate, epoxidized oils, crosslinkable acrylic compounds, and mixtures thereof.

2. A pneumatic tire according to claim 1, wherein the plasticizing additive is a polymer chosen from the group consisting of ethylene/vinyl acetate copolymers, vinyl chloride/vinyl acetate copolymers, polybutenes, polyesters, crosslinkable acrylic compounds, and mixtures thereof.

3. A pneumatic tire according to claim 2, wherein the polymer plasticizing additive has a number-average molecular weight (Mn) of between 2000 and 10,000 g/mol.

4. A pneumatic tire according to claim 1, wherein the chlorinated thermoplastic polymer includes a secondary additive chosen from the group consisting of tin salts, calcium salts, barium salts, zinc salts, perchlorates, amines, and mixtures thereof.

5. A pneumatic tire according to claim 1, wherein the chlorinated thermoplastic polymer includes an additive chosen from the group consisting of adipates and phthalates.

6. A pneumatic tire according to claim 5, wherein a content of the additive chosen from the group consisting of adipates and phthalates is less than 2% by weight.

7. A pneumatic tire according to claim 1, wherein a number-average molecular weight (Mn) of the chlorinated thermoplastic polymer is greater than 50,000 g/mol.

8. A pneumatic tire according claim 1, wherein the chlorinated thermoplastic polymer is chosen from the group consisting of polyvinyl chloride (PVC), polyvinylidene chloride (PVDC), and chlorinated polyvinyl chloride (CPVC).

9. A pneumatic tire according to claim 1, wherein the thickness of the protective layer is between 10 and 30 micrometers.

10. A pneumatic tire according to claim 1, wherein a stress in the tire relative to an initial cross section in extension at 100% uniaxial strain and at ambient temperature is less than 20 MPa.

11. A pneumatic tire according to claim 1, wherein an elongation of the tire at break in uniaxial extension and at ambient temperature of the protective layer is greater than 90%.

12. A pneumatic tire according to claim 11, wherein the elongation of the tire at break in uniaxial extension and at ambient temperature of the protective layer is greater than 150%.

13. A pneumatic tire according to claim 1, wherein the self-sealing layer includes a thermoplastic styrene (TPS) elastomer and more than 200 phr of an extender oil of the TPS elastomer, with phr signifying parts by weight per 100 parts of elastomer.

14. A pneumatic tire according to claim 13, wherein the TPS elastomer is present in the self-sealing layer in the amount of more than 50 phr, with phr signifying parts of weight per 100 parts of elastomer.

15. A pneumatic tire according to claim 13, wherein the TPS elastomer is chosen from the group consisting of styrene/butadiene/styrene (SBS) copolymers, styrene/isoprene/styrene (SIS) copolymers, styrene/isoprene/butadiene/styrene (SIBS) copolymers, styrene/ethylene/butylene/styrene (SEBS) copolymers, styrene/ethylene/propylene/styrene (SEPS) copolymers, styrene/ethylene/ethylene/propylene/styrene (SEEPS) block copolymers, and mixtures thereof.

16. A pneumatic tire according to claim 15, wherein the TPS elastomer is chosen from the group consisting of SEBS copolymers, SEPS copolymers, and mixtures thereof.

17. A pneumatic tire according to claim 1, wherein the self-sealing layer includes:
- an unsaturated diene elastomer as a predominant elastomer;
- between 30 and 90 phr of a hydrocarbon resin;
- a liquid plasticizer having a glass transition temperature (Tg) below −20° C., at a weight content between 0 and 60 phr; and
- from 0 to less than 30 phr of a filler,
- wherein phr signifies parts by weight per 100 parts of elastomer.

18. A pneumatic tire according to claim 17, wherein the unsaturated diene elastomer is chosen from the group consisting of polybutadienes, natural rubber, synthetic polyisoprenes, butadiene copolymers, isoprene copolymers, and mixtures thereof.

19. A pneumatic tire according to claim 18, wherein the unsaturated diene elastomer is chosen from the group consisting of natural rubbers, synthetic polyisoprenes, and mixtures thereof.

* * * * *